(12) United States Patent
Holt

(10) Patent No.: US 10,885,085 B2
(45) Date of Patent: Jan. 5, 2021

(54) SYSTEM TO ORGANIZE SEARCH AND DISPLAY UNSTRUCTURED DATA

(71) Applicant: Critical Informatics, Inc., Bremerton, WA (US)

(72) Inventor: Fredrick Baden Holt, Seattle, WA (US)

(73) Assignee: Critical Informatics, Inc., Bremerton, WA (US)

(*) Notice: Subject to any disclaimer, the term of this patent is extended or adjusted under 35 U.S.C. 154(b) by 215 days.

(21) Appl. No.: 15/863,803

(22) Filed: Jan. 5, 2018

(65) Prior Publication Data
US 2018/0129736 A1 May 10, 2018

Related U.S. Application Data

(60) Division of application No. 15/333,201, filed on Oct. 25, 2016, now abandoned, which is a
(Continued)

(51) Int. Cl.
*G06F 16/338* (2019.01)
*G06F 16/93* (2019.01)
(Continued)

(52) U.S. Cl.
CPC .......... *G06F 16/338* (2019.01); *G06F 16/313* (2019.01); *G06F 16/316* (2019.01);
(Continued)

(58) Field of Classification Search
CPC .... G06F 3/0485; G06F 3/0482; G06F 17/212;
G06F 3/04817; G06F 16/93; G06F 3/04842; G06F 16/285; G06F 3/0483; G06F 16/904; G06F 16/9577; G06F 3/04815; G06F 9/451; G06F 16/287; G06F 16/3323; G06F 16/03; G06F 16/24578; G06F 16/248; G06F 16/9535; G06F 21/36; G06F 21/566; G06F 3/04845; G06F 16/2228; G06F 16/2468; G06F 16/313;
(Continued)

(56) References Cited

U.S. PATENT DOCUMENTS 6,510,406 B1   1/2003 Marchisio
6,611,825 B1 * 8/2003 Billheimer ............ G06F 16/313
                                                        706/45

(Continued)

*Primary Examiner* — Yuk Ting Choi
(74) *Attorney, Agent, or Firm* — Davis Wright Tremaine LLP

(57) ABSTRACT

A system to organize, search and display unstructured data comprising a token retrieval module, a document indexing engine, a subspace search module and a user interface module has been devised. The system retrieves a plurality of tokens and associates them with coordinates in subspace. It also retrieves documents and creates a multidimensional matrix of documents and tokens where each cell contains the number of times the token occurs in each document. That matrix is employed in a search using user specified search terms. The search results are displayed such that the search tokens occupy specific spatial coordinates and documents spatial coordinates are dictated by the relative preponderance of each search term in each document.

20 Claims, 16 Drawing Sheets

Related U.S. Application Data continuation-in-part of application No. 15/239,737, filed on Aug. 17, 2016.

(60) Provisional application No. 62/282,990, filed on Aug. 17, 2015.

(51) Int. Cl.
  G06F 16/31 (2019.01)
  G06F 16/33 (2019.01)

(52) U.S. Cl.
  CPC ........ G06F 16/334 (2019.01); G06F 16/3331 (2019.01); G06F 16/93 (2019.01)

(58) Field of Classification Search
  CPC ...... G06F 16/338; G06F 16/444; G06F 16/51; G06F 16/5866; G06F 16/951; G06F 2203/04108; G06F 40/197; G06F 16/84; G06F 3/016; G06F 3/03547; G06F 3/04166; G06F 3/04855
  See application file for complete search history.

(56) References Cited

U.S. PATENT DOCUMENTS

| | | | |
|---|---|---|---|
| 6,701,305 B1 | 3/2004 | Holt et al. | |
| 8,046,317 B2 | 10/2011 | Dasgupta et al. | |
| 8,056,019 B2 * | 11/2011 | Borchardt | G06F 3/04815 715/850 |
| 9,135,573 B1 | 9/2015 | Rodriguez et al. | |
| 9,201,864 B2 | 12/2015 | Speer et al. | |
| 9,536,203 B2 | 1/2017 | Wunderling | |
| 2002/0107962 A1 | 8/2002 | Richter et al. | |
| 2007/0083509 A1 | 4/2007 | Wu et al. | |
| 2009/0288006 A1 * | 11/2009 | Audet | G06F 17/2205 715/716 |
| 2012/0166434 A1 | 6/2012 | Lee et al. | |
| 2013/0120464 A1 * | 5/2013 | Wei | G06F 3/04842 345/672 |
| 2013/0124523 A1 | 5/2013 | Rogers et al. | |
| 2015/0238148 A1 | 8/2015 | Georgescu et al. | |

* cited by examiner

SYSTEM TO ORGANIZE SEARCH AND DISPLAY UNSTRUCTURED DATA

CROSS-REFERENCE TO RELATED APPLICATIONS

This application is a divisional of U.S. patent application Ser. No. 15/333,201, titled "SYSTEM TO ORGANIZE SEARCH AND DISPLAY UNSTRUCTURED DATA," and filed on Oct. 25, 2016, which is a continuation-in-part of U.S. patent application Ser. No. 15/239,737, titled "SYSTEM TO ORGANIZE SEARCH AND DISPLAY UNSTRUCTURED DATA", and filed on Aug. 17, 2016, which claims the benefit of and priority to U.S. provisional patent application Ser. No. 62/282,990, titled "System for displaying, searching, and organizing unstructured data", and filed on Aug. 17, 2015, the entire specification of each of which is incorporated herein by reference in its entirety.

BACKGROUND OF THE INVENTION

Field of the Invention

The present invention is in the field of use of computer systems to organize, search and display collections of unstructured data for the purpose of text or data mining. More specifically use of specialized linear algebraic computer programming to allow the search and display of specific subsets of items from massive collections of electronic documents.

Discussion of the State of the Art

Since 1970 vector-space models have been used for information retrieval from collections of unstructured text documents. The initial simple vector-space models suffered the same problems encountered today in searching the Internet: polysemy (returning unrelated documents) and synonymy (missing related documents). In the early 1990s the concept was introduced of reinforcing correlations among the documents by working in a subspace of much lower dimension than the original vector-space model. A systematic exploration of the rich framework implied by this concept was initiated several years later. One of the most powerful aspects of this framework for subspace representations was the meaningful coupling between natural language and the computational model. The framework for subspace representations is important for two reasons. First, text mining remains an important specialty within data mining and information retrieval in general. Second, vector-space models are appearing in other data mining efforts; where there are vector-space models, subspace representations are possible. As our understanding of the implications and power of subspace representations grows, some central challenges remain.

What is needed is a system that uses subspace representation of very large bodies of document data and tokens to allow the organization of that data, the data to be manipulated using modest storage and computational resources relative to the size of the data leading to the organization of the data, allowing the data to be searched for terms of analytical interest and then the resultant data to be displayed in a quickly comprehended and highly modifiable manner. The present invention brings tokens into the subspace representation in a completely general manner, which provides the needed capability.

SUMMARY OF THE INVENTION

Accordingly, the inventor has developed a system to organize, search and display unstructured data. The invention extends naturally to semi-structured data. It can also be used to organize, search and display structured data when this structured data is treated as unstructured or semi-structured data, for example, network flow data, financial data, health data, or biological data.

According to a preferred embodiment of the invention, the inventor discloses a system to organize, search and display unstructured data comprising a token retrieval module stored in a memory of and operating on a processor of a computing device and configured to: retrieve a plurality of tokens from a source; associate retrieved tokens with multidimensional coordinates in subspace; persistently store the subspace coordinate associated tokens. The embodiment further comprises a document indexing engine stored in a memory of and operating on a processor of a computing device and configured to: retrieve documents from a document source; create a raw multidimensional matrix of documents and subspace coordinate associated tokens where each cell contains the number of times the single token occurs in the corresponding document; create a normalized matrix of documents and subspace coordinate associated tokens from the raw multidimensional matrix; and create a rank basis matrix for the subspace. The embodiment further comprises a subspace search module stored in a memory of and operating on a processor of computing device and configured to: receive selected tokens as search tokens from the user interface module; determine coordinates for the selected tokens associated with the rank basis matrix; perform a search of documents using the coordinates associated with the search tokens and using rank basis matrix; and calculate document display coordinates from search results. The embodiment also comprises a user interface module stored in a memory of and operating on a processor of a computing device and configured to: allow a user to select document source for an analysis; allow the user to select token source for analysis; accept selected subspace coordinate associated search tokens from the user; display search tokens and documents at view space coordinates calculated from document display coordinates retrieved from the subspace search module.

According to another embodiment of the invention, a system to organize, search and display unstructured data has been devised and reduced to practice wherein search tokens are designated through selection from a list of tokens. Wherein, at least at least one set of documents is retrieved from a corporate specific source. Wherein at least one set of documents consists of network flow data from transmission into and out of a computer network. Wherein at least one set of tokens are network addresses associated with a computer network. Wherein at least one token is a network port number. Wherein at least at least one token is an identifier of a process associated with computer network traffic. Wherein at least one token is an identifier of a protocol used in network data transmission. Wherein display coordinates of at least one search token on a search result view field may be modified by a user. Wherein, the source of at least one set of tokens is from a lexicon of corporate field specific terms.

According to a preferred embodiment of the invention, a method for organization, search and display unstructured data comprising the steps of: a) retrieving a plurality of tokens and assigning subspace coordinates to them using a token retrieval module; b) retrieving a plurality of documents and indexing them into a multidimensional matrix with the retrieved tokens using a document indexing engine; c) normalizing and centering the rows and columns of the multidimensional matrix using the document indexing engine; d) searching the normalized multidimensional matrix with user specified tokens and creating display coordinate for each token and each searched document using a subspace search module; e) displaying search result dictated tokens and documents at coordinates that reflect the relative preponderance of each search token in each analyzed document using a user controlled display module.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
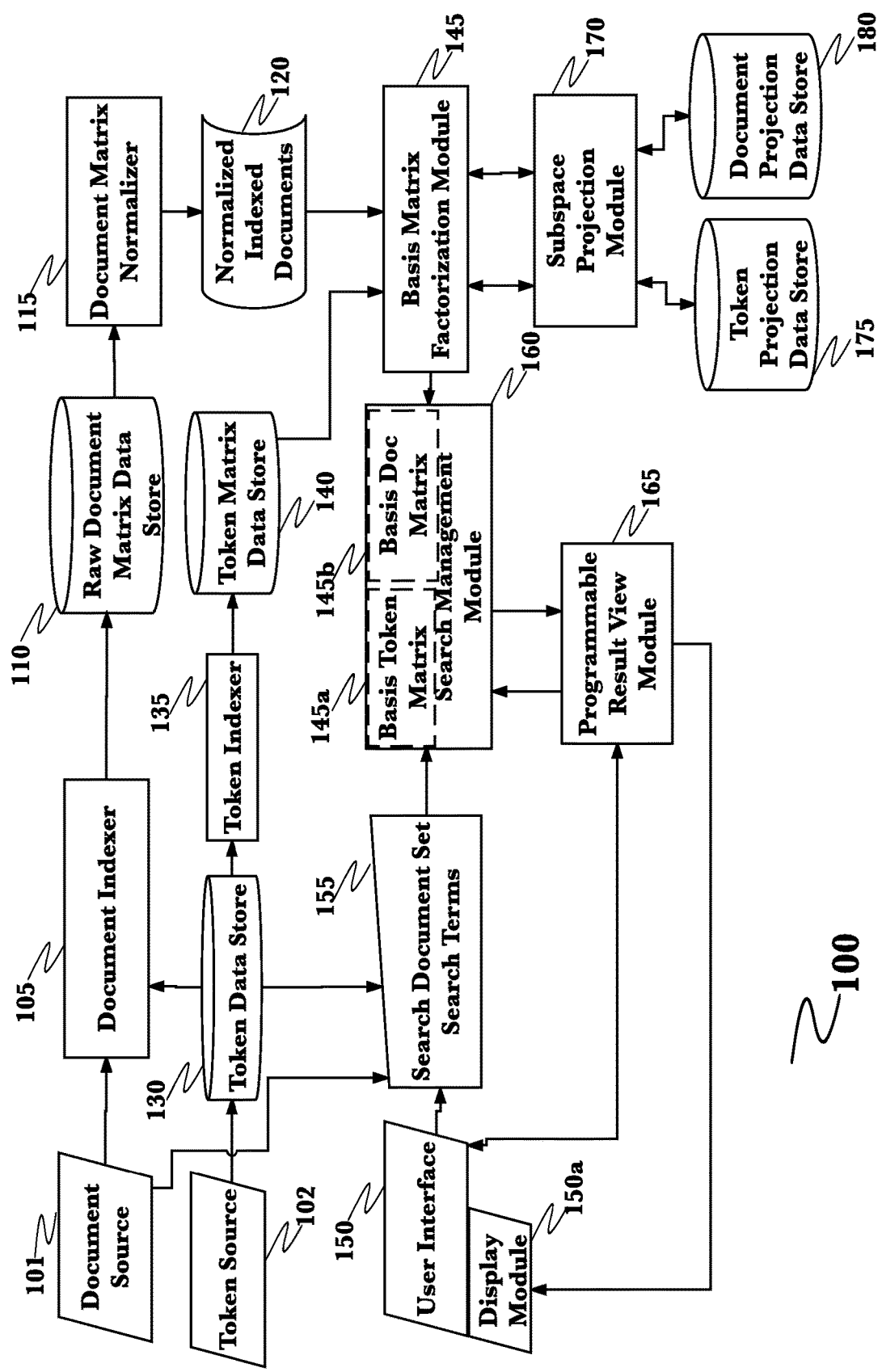
FIG. 1 is a diagram of an exemplary architecture of a system to organize, search and display unstructured data according to an embodiment of the invention.

The inventor has conceived, and reduced to practice, a system to organize, search and display unstructured data, by developing a general method to bring the tokens into a subspace representation and to use these tokens as intuitive controls and displays for analyzing the unstructured data. When applied to network flow data, this invention provides a system for the timely detection and mitigation of cyberattacks employing a method to rapidly display cyberattack specific markers from otherwise overwhelming volumes of network traffic data using groups of attack indicative traffic related tokens.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

The present invention was initially inspired as a semi-automated solution to the problems of analyzing large collections of text documents. As such, the terms for describing the invention originate from this context; however, broader definitions of a few terms illustrate how the invention can be readily used in other contexts for data analysis.

As used herein, a "token" is a value for a field in the data, including but not limited to stemmed words or phrases in free text and normalized values for structured fields (e.g. dates, names, addresses). For network flow data, a "token" may include but is not limited to network addresses, geographical information, owner information, protocols, packet header information, port numbers, or reputation signatures. For financial data, a "token" may include but not be limited to a transaction type, client information, provider information, machine information, stock information, monetary values, dates, or location information.

As used herein, a "document" is a collection of tokens. The format and granularity of these may vary. A non-exhaustive list of document examples are e-mail messages, e-mail strings, text documents, presentations, paragraphs, sentences, audio clips, photographs, videos, video clips, network flow packets, network flow transmissions, financial transactions, and the like.

As used herein, a "user" is an agent interacting with the controls and outputs of this invention. A user may be a human user, or a user may be a mobile app, an artificial intelligence program, an optimization program, or a machine learning program.

Conceptual Architecture

FIG. 1 is a diagram of an exemplary architecture of a system to organize, search and display unstructured data according to an embodiment of the invention 100. In this embodiment, the document indexer 105 retrieves a large corpus of documents which may number in the magnitude of $10^9$ from a plurality of varying document sources 101. Examples of "documents" in this usage may be multiple page texts, paragraphs, small token groupings, network transmissions, individual packets, network routing messages or conceivably any grouping of data that may be further broken down into smaller information conveying parts. Retrieved documents may be a pre-filtered subset of all available documents based upon pre-determined criterion or criteria. The document indexer 105 analyzes documents for presence of each token of a chosen group of tokens which may number from 1 to approximately 30000 tokens from a token data store 130. Tokens are chosen from a source representing all possible tokens and may represent a set comprising terms related to a specific industry, company, knowledge area or application and may by analogous to natural language or word stems 102. The product of the document indexer is a matrix where each cell of the matrix represents the number of occurrences of token i in document j. As a highly simplistic example, a "38" in cell (42,13) may indicate that the token "claw" appears "38" times in the document *Born Free*. Many other examples may be supplied by those skilled in the field. These, "raw," document matrices may then be stored 110. While capturing the necessary information, raw document matrix is ill suited to the analyses to be carried out. It is invariably very large and sparse compared to alternatives, requiring inefficient, prohibitive use of computing resources, and requiring significantly more time to provide results possibly inferior to alternative, less resource demanding normalized representations.

Without normalization, data fields may have widely varying ranges. The differences among the ranges may be inherent in the different fields being sampled (e.g. cost, dimensions, build to sell time). The differences may also reflect the populations being sampled. If the systems does not first normalize ranges across rows, then data fields with numerically larger ranges may obscure those with smaller ranges, leading to inaccurate analysis results. For each data field, the system may consider some representative or average score and variation, so that the values across the rows are comparable. Additionally, some data records may cover many more samples than others. This phenomenon may occur between short documents about a single, specific or highly defined topic such as but not limited to scientific papers or project status reports and long, general documents such as reviews, textbooks and references. The system may rescale each column to find a balance between specificity and length of the data record.

Raw matrices 110 may also be culled to remove data fields that show no variation between records or data records that are so generic as to show no distinguishing scores in any data field. There may also be documents that bear little or no distinguishable relationship to any others in the set. The system may remove all of these documents from a raw matrix and analyze them separately during analysis.

Data records may also be centered as the numerical methods used to find subspace representations will be skewed if we leave the data uncentered. The first basis vector we find will point strongly toward the center of the data, and all subsequent basis vectors will have to be orthogonal to that. However, if we have the system make the rank correction of centering the collection of data records, $A \rightarrow A - \mu_{m \times 1} < 1 >_{1 \times n}$ then the numerical methods employed during analysis will be acting to reveal structure among the data records as designed. Centering the data records is always a good idea, and it should be the last transformation to take place. The average data record $\mu$ may only be an approximation of the exact average of the data records; using an approximate center could be expected for collections of data records that are enormous, open-ended, or dynamic. More important than computing the exact mean data record is moving the origin well inside the cloud of data points.

These normalization related transformations are performed by the document matrix normalizer 115 giving rise to matrices of normalized indexed documents 120 and it is projections of normalized, indexed matrices that are used for analyses by the system 160.

The token set may be indexed in a manner similar to the document set 135 and the resulting matrix of tokens and each tokens synonyms and antonyms placed in a data store 140 for persistent use during analyses.

A search by the system is originated by user interaction 150 which may be the retrieval of a file that includes a document set designation and a plurality of search tokens or terms to be applied to that document set or may be more interactive in nature where search tokens are applied to a pre-loaded document set, or a small number of search tokens are entered with a document set designation 155, to list three of many possible alternatives known to those skilled in the art. Using the full matrices of documents and tokens as described above in a search would consume far too large computational storage and processing resources, instead, searches are performed on factored partial rank dimensional subspace projections 145a, 145b of the parental token and document vector matrices as computed by a basis matrix factorization module 145. Full rank dimension projections may also be created for both tokens and documents 170 for persistent storage 175, 180 and later re-use during revisualization.

Display parameters of a search may also be controlled through the user interface 150, either interactively or through use of pre-existing command files, where document display representation, for example whether icons or symbols are used, and whether documents of different types are differentiated, to name a small subset of the representation choices known to those skilled in the art, are specified. Placement of the search terms in relation to displayed dimensions as well as term weighting and groupings may also be controlled at the user interface 150. Conversion of system search results created by the programming of the search management module 160 into displayable data using user specified parameters is performed by the functions of the programmable result view module 165 and then actual display carried out by the display module 150a.

Figure 14:
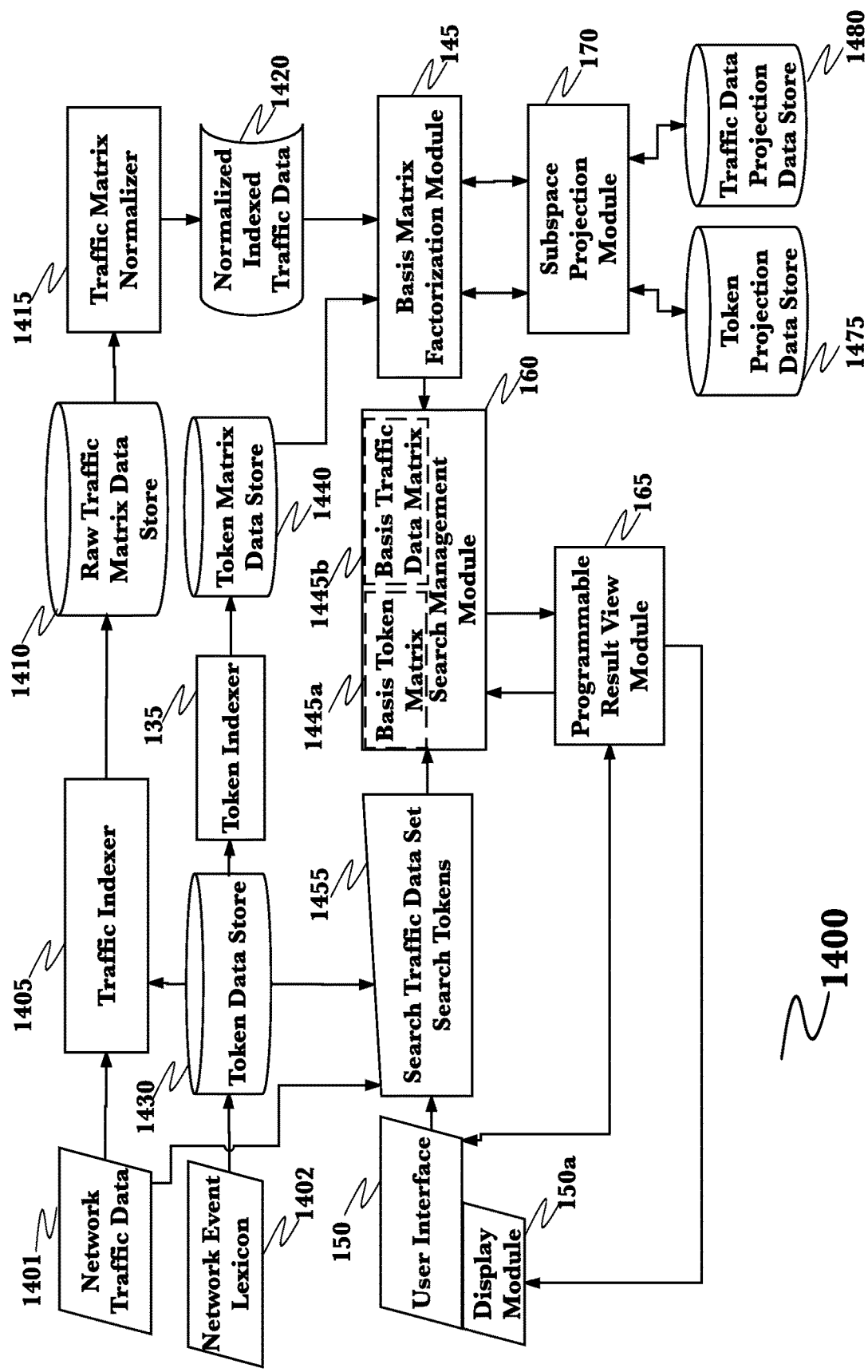
FIG. 14 is a diagram of an exemplary architecture of the use of a system to organize, search and display unstructured data to analyze and rapidly identify network security breaches according to an embodiment of the invention.

FIG. 14 is a diagram of an exemplary architecture of the use of a system to organize, search and display unstructured data to analyze and rapidly identify network security breaches 1400 according to an embodiment of the invention. In this alternate embodiment of 100, the network traffic indexer 1405 retrieves a large corpus of network data which may number in the magnitude of $10^9$ pieces from a plurality of varying network infrastructure sources 1401. Examples of "network traffic data" in this usage may be network control packets, data packets, conceivably any grouping of network data that may be further broken down into smaller information conveying parts. Retrieved network traffic data may be a pre-filtered subset of all available network data based upon pre-determined criterion or criteria. The traffic indexer 105 analyzes network data for presence of each token of a chosen group of tokens which may number from 1 to approximately 30000 tokens from a network event lexicon token store 1430. Tokens are chosen from a source representing all possible tokens and may represent a set comprising all terms in a network event lexicon which may include network commands, packet content traces representing specific events or meanings, malicious code samples among many other network data examples known to those skilled in the art 1402. The product of the traffic indexer 1405 is a matrix where each cell represents the number of occurrences of token i in network datum j. As a highly simplistic example, a "38" in cell (42,13) may indicate that the token "ACK" appears "38" times in traffic isolated from workstation Y5. Many other examples may be supplied by those skilled in the field. These, "raw" traffic event matrices may then be stored 1410. While they capture the necessary information, raw document matrix is ill suited to the analyses to be carried out. It is invariably very large and sparse compared to alternatives, requiring inefficient, prohibitive use of computing resources, and requiring significantly more time to provide results possibly inferior to alternative, less resource demanding normalized representations.

Without normalization, data fields may have widely varying ranges. The differences among the ranges may be inherent in the different fields being sampled (e.g. traceroute hop addresses, ping response percentage, workstation Y5 to server CORE47a session packet contents). The differences may also reflect the populations being sampled. If the system does not first normalize ranges across rows, then data fields with numerically larger ranges may obscure those with smaller ranges, leading to inaccurate analysis results. For each data field, the system may consider some representative or average score and variation, so that the values across the rows are comparable. Additionally, some data records may cover many more samples than others. This phenomenon may occur between short network data sets such as but not limited to a single GOOGLE™ search or internet router discovery exchange and long, general documents such as all corporate network traffic between 22:03 and 22:32. The system may rescale each column to find a balance between specificity and length of the data record.

Raw matrices 1410 may also be culled to remove data fields that show no variation between records or for data records that are so generic as to show no distinguishing scores in any data field. There may also be data sets that bear little or no distinguishable relationship to any others in the set. The system may remove all of these documents from a raw matrix and analyze them separately during analysis.

Data records may also be centered as the numerical methods used to find subspace representations will be skewed if we leave the data uncentered. The first basis vector we find will point strongly toward the center of the data, and all subsequent basis vectors will have to be orthogonal to that. However, if we have the system make the rank correction of centering the collection of data records, A→A−$\mu_{m \times 1} <1>_{1 \times n}$, then the numerical methods employed during analysis will be acting to reveal structure among the data records as designed. Centering the data records is always a good idea, and it should be the last transformation to take place. The average data record $\mu$ may only be an approximation of the exact average of the data records; using an approximate center could be expected for collections of data records that are enormous, open-ended, or dynamic. More important than computing the exact mean data record is moving the origin well inside the cloud of data points.

These normalization related transformations are performed by the traffic matrix normalizer 1515 giving rise to a matrix of normalized indexed documents 1420 and it is projections of normalized, indexed matrices that are used for analyses by the system 160.

The token set 1430 may be indexed in a manner similar to the document set 135 and the resulting matrix of tokens and each token's synonyms and expected immediate predecessor and successor placed in a data store 1440 for persistent use during analyses.

A search by the system is originated by user interaction 150 which may be the retrieval of a file that includes a network traffic data set designation and a plurality of search tokens or terms to be applied to that document set or may be more interactive in nature where search tokens are applied to a pre-loaded document set or a small number of search tokens are entered with a network traffic data set designation 1455, to list three of many possible alternatives known to those skilled in the art. Using the full matrices of documents and tokens described above in a search would consume far too large computational storage and processing resources, instead, searches are performed on factored partial rank dimensional subspace projections 1445a, 1445b of the parental token and document vector matrices as computed by a basis matrix factorization module 145. Full rank dimension projections may also be created for both tokens and documents 170 for persistent storage 1475, 1480 and later re-use during revisualization.

Display parameters of a search may also be controlled through the user interface 150, either interactively or through use of pre-existing command files, where data display representation, for example whether icons or symbols are used, and whether data of different types are differentiated, to name a small subset of the representation choices known to those skilled in the art, are specified. Placement of the search tokens in relation to displayed dimensions as well as token weighting and groupings may also be controlled at the user interface 150. Conversion of system search results created by the programming of the search management module 160 into displayable data using user specified parameters is performed by the functions of the programmable result view module 165 and then actual display carried out by the display module 150a.

Detailed Description of Exemplary Embodiments

Figure 2:
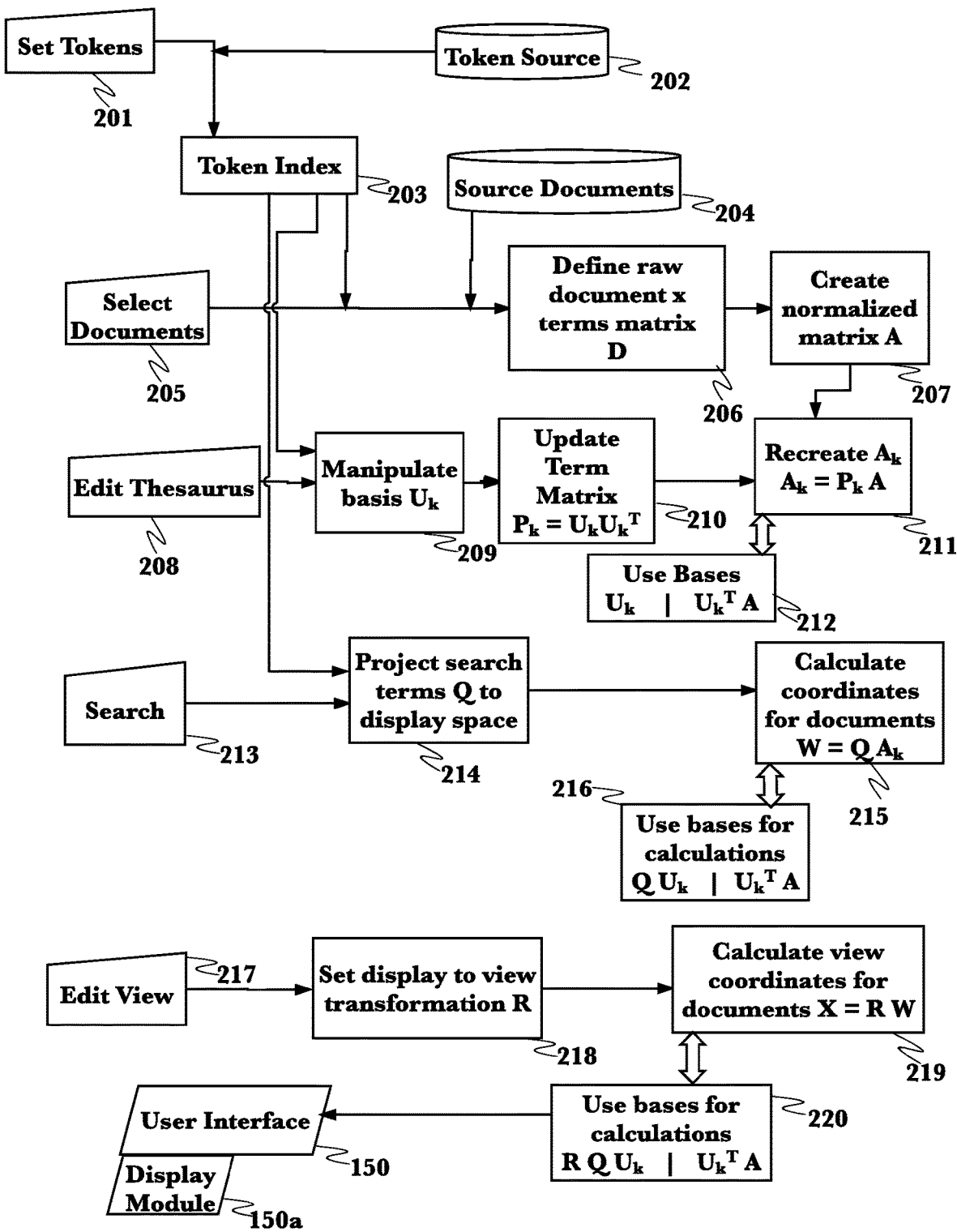
FIG. 2 is a flow diagram of function of the system to organize, search and display unstructured data according to an embodiment of the invention.

FIG. 2 is a flow diagram of function of the system to organize, search and display unstructured data according to an embodiment of the invention 200. Shown here are five major operations initiated by an investigator and performed by the system: Set tokens 201; Select documents 205; Edit thesaurus 208; Search 213; and Edit view 217. Tokens are retrieved for analysis from a source of tokens 202. Retrieved tokens may include such groupings as, but not limited to topic related, business or scientific field specific, corporate generated and application specific such as network event specific. Tokens are processed by at least association of their synonyms and antonyms and placed in the system's token index 203 for use in indexing documents selected 205 for analyses to be run by the system 100. Documents, which may include but are not limited to text of length from several pages to small groupings of words of approximate sentence length, collections of characters as may be found in such settings as network transmissions and the like, computer code dumps, voice recordings, and images, as well as other information bearing formats known to those skilled in the field, that are to be included in analysis are retrieved from document sources 204 which may include but are not limited to a set partially comprising cloud information repositories related to subjects of interest, information returned by web searches, computer core dumps, voice recording databases, network monitoring and control equipment, corporate operations databases, image repositories and individually entered files or text, to list some of a larger set of possible sources. Once selected, documents may be indexed against indexed tokens (aka. terms) to form a raw, un-normalized matrix of term prevalence per each document datum (D) 206. The raw token x document matrix may then normalized by characteristics such as, but not limited to: document width range equalization, term occurrence range equalization, and cell centering, among other normalization tasks known to those skilled in the art to create a normalized matrix (A) 207 that is more useful in data analysis.

Prior to analysis, it is possible that the total collection of indexed tokens, the thesaurus may be edited to perform such actions as add new tokens specific to the analysis run, modify synonym lists, modify antonym lists, and addition of context cues to reduce polysemy occurrence among other possible thesaurus modifications known to those skilled in the art under these conditions 208. The collection of tokens present during this stage may exceed $1 \times 10^5$ and modifying the full rank-k token matrix ($P_k$) would be resource prohibitive, therefore manipulation is carried out on much smaller and easier to computationally manipulate partial basis matrix ($U_k$) 209 which is then first used to update the rank-k token (term) matrix ($P_k$) 210 and the rank-k, normalized document x token approximation matrix ($A_k$) 211 where again computations are actually performed on simpler partial basis matrices ($U_k | U_k^T$ A) which form $A_k$ 212.

Searches (analyses) 213 are performed by projecting a plurality of selected search terms (Q) to the display space 214. This causes the system to retrieve documents harboring the selected search terms placing pre-determined weighting on each, and place them in the display space at specific coordinates according to the equation W=Q $A_k$ where W represents the display space coordinate 215. As performed previously, all calculations are performed on the less resource intensive basis matrices 216. The calculated document coordinates are then transformed through a pre-decided view factor R for user viewing and manipulation 219. The actual calculations are once again performed on the basis matrices 220 and the results displayed on part of the user interface 150, 150a.

Figure 3:
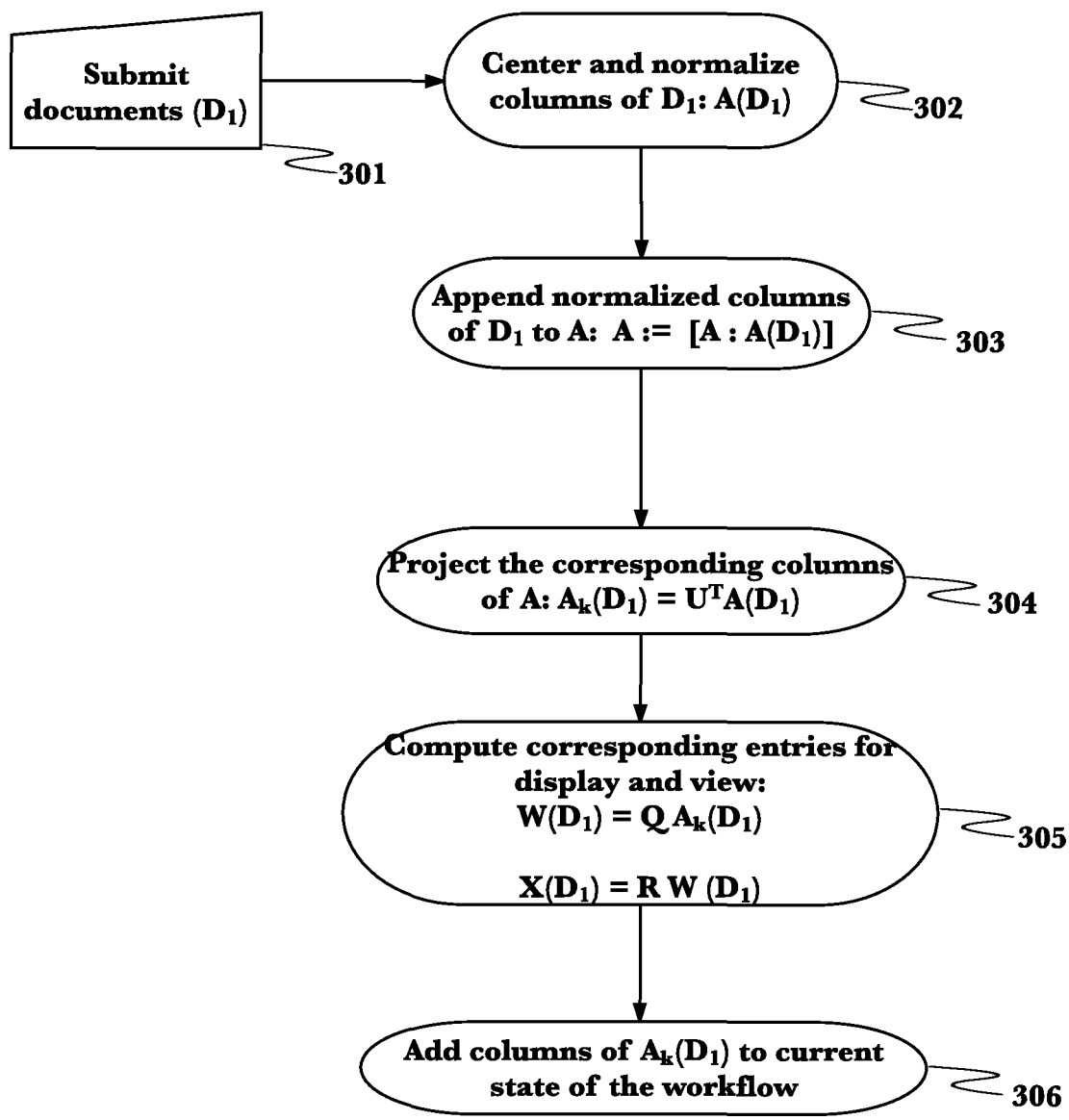
FIG. 3 is a process flow addition of documents to the system to organize, search and display unstructured data according to an embodiment of the invention.

FIG. 3 is a process flow diagram illustrating addition of documents 300 to the system to organize, search and display unstructured data according to an embodiment of the invention. It is possible that new documents may need to be added to an existing token x document matrix which may occur during an analysis 301. Such addition involves manipulation of the stored, derived rank-k subspace projection of the matrix, $A_k$. This is accomplished by creating a raw token x document matrix of the to-be-added documents $D_1$ using the existing tokens followed by centering and normalization of the columns of $D_1$ to form $A(D_1)$ 302. The new normalized and centered columns of D1: A(D1) may then be appended onto the parental normalized and centered matrix A 303 by projecting the D1 corresponding columns onto the less resource demanding basis matrix: $U^T A(D1)$ 304. All that is then left to perform may be to re-compute the display and view data for the stored $A_k$ matrix 305 which completes the process of making the added documents part of the analysis 306

Figure 4:
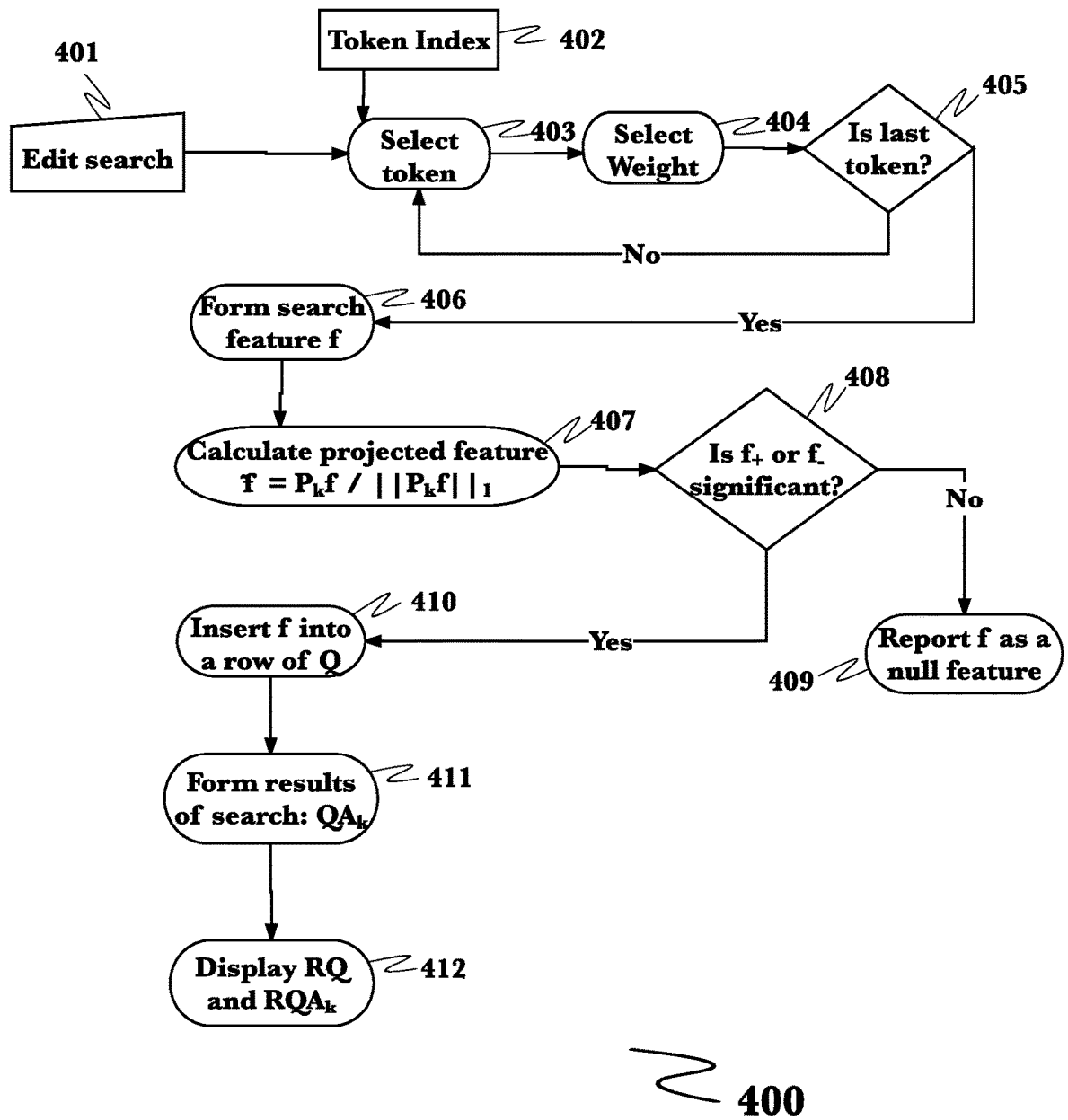
FIG. 4 is a process flow diagram showing a document search being carried out using the system to organize, search and display unstructured data according to an embodiment of the invention.

FIG. 4 is a process flow diagram showing a document search being initiated 400 using the system to organize, search and display unstructured data according to an embodiment of the invention. Searches by the system are edited 401 by a user selecting one or more tokens 403 from pre-existing token index 402. At that time the influence or weight of each token or term on the search is set by the user 404. Term selection and weight specification continues until all desired terms have been added to the search 405 at which time the new terms are transformed to a format most efficient for the system to perform the search 406 and the influence of the new search terms are calculated against the rank-k projection of existing indexed terms 407 which may or may not 408 result in the new terms being added to the list of active search terms 410 used in analysis respectively 409|410. One non-exclusive, highly simplistic, example of a selected new token that may not become a search query term would be a synonym of a token already in the search list, but other examples known to those skilled in the art would also fall within potential factors used in the invention. Search analysis is then run reflecting the influence newly added tokens 411 and the results of the search inclusive of those added tokens and their specified weighted influence displayed 412.

Figure 5:
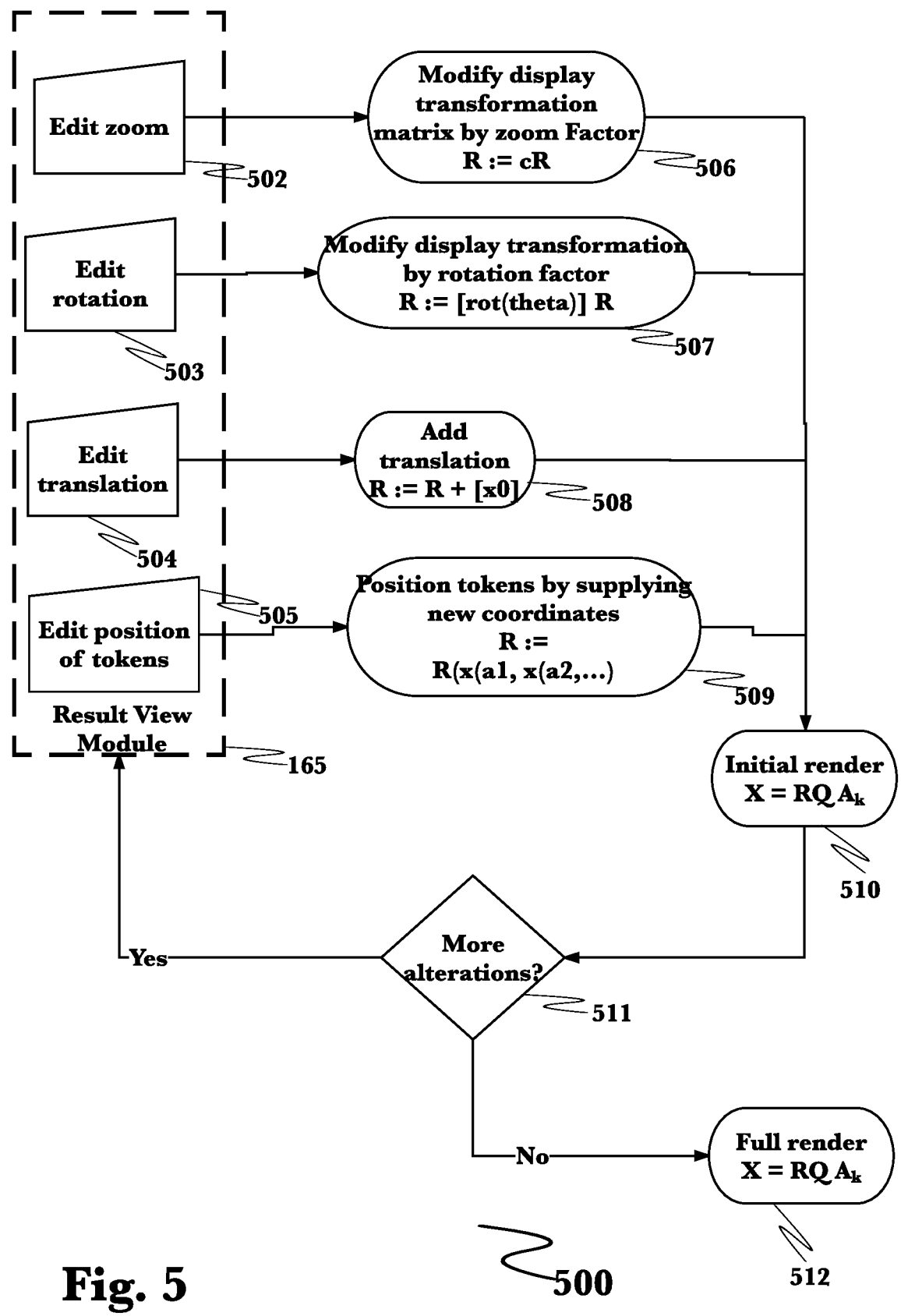
FIG. 5 is a process flow diagram showing display manipulations available to optimize view of search result documents using the system to organize, search and display unstructured data according to an embodiment of the invention.

FIG. 5 is a process flow diagram showing display view manipulations available to optimize view of search result documents 500 using the system to organize, search and display unstructured data according to an embodiment of the invention. An important requirement when displaying data where a large amount of possibly partially overlapping data is expected for display, between some and much of which possibly near misses to what is desired, is that the view of that data may be manipulated to assist focusing on the exact data desired while still providing available context. The system disclosed provides significant control over view aspects such as zoom 502, which works by modifying the display transformation factor matrix R 506 to allow users to enlarge and focus on specific data representation groupings to the exclusion of unwanted context; Rotation 503, which allows groupings to be manipulated around a rotation factor 507 to place groupings in different areas of the screen; translation 504 which may allow users to change the perspective between grouped, overlapping documents to better isolate particular subgroupings for analysis 508. This control would work especially strongly with both zoom 502 and rotation 503. Of particular interest is the complex control of being able to affect document groupings and positions by changing the positions of tokens 505 on the screen as further illustrated below FIG. 8, FIG. 9, FIG. 10 the effect of tokens on documents in the system as displayed may be thought of as similar to magnets, the presence of a token in a particular position may serve to attract documents towards the token with influence relative to token weighting and token prevalence within the document. Documents possessing more than one search term position at coordinates of cumulative token influence. Changing token positions may also be used to fine tune positioning of document on the view field 509.

As calculating and fully rendering possibly many data representations on a view field is computational and time resource intensive, the system takes a two step approach of showing very rough, imprecise renderings 510 while additional manipulations are in progress to denote view field changes actively being made and then when alterations have ceased 511 for a pre-programmed length of time, performing a full accurate, static rendering of the view field 512.

Figure 6:
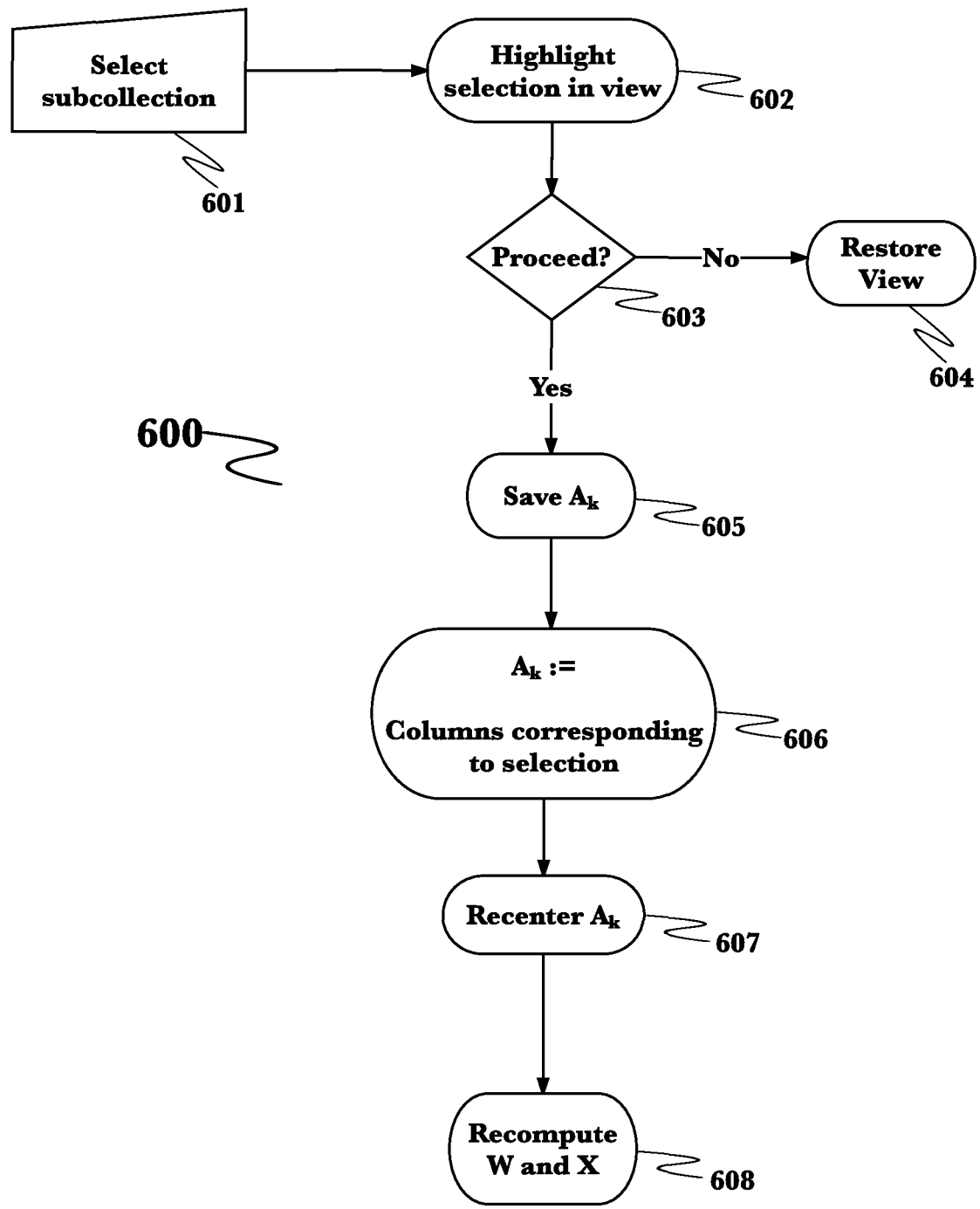
FIG. 6 is a process flow diagram of sub-collection selection from a display document set using the system to organize, search and display unstructured data according to an embodiment of the invention.

FIG. 6 is a process flow diagram of sub-collection selection from a display document set 600 using the system to organize, search and display unstructured data according to an embodiment of the invention. The may be occasion where analyst has run a first search analysis and is viewing the a subcollection of the document 601 results of that search for use as the document set of a second search. This is accomplished by the user first highlighting the subcollection grouping on the screen which may indeed denote a single visible group of data representations on the screen or encompass more than one visual group 602. Once the user has highlighted all desired documents, she may confirm her desire to use those subcollection documents as the document source for another search 603. The system will create and save a new rank-k projection of the document x token matrix which includes only the selected documents 605 in other words, where the columns of the new rank-k matrix $A_k$ correspond to the selected document data 606. $A_k$ will be re-centered to reflect the new document population which may be very different from the original 607. New search result coordinates for the new, derivative search will be calculated for display 608.

Figure 7:
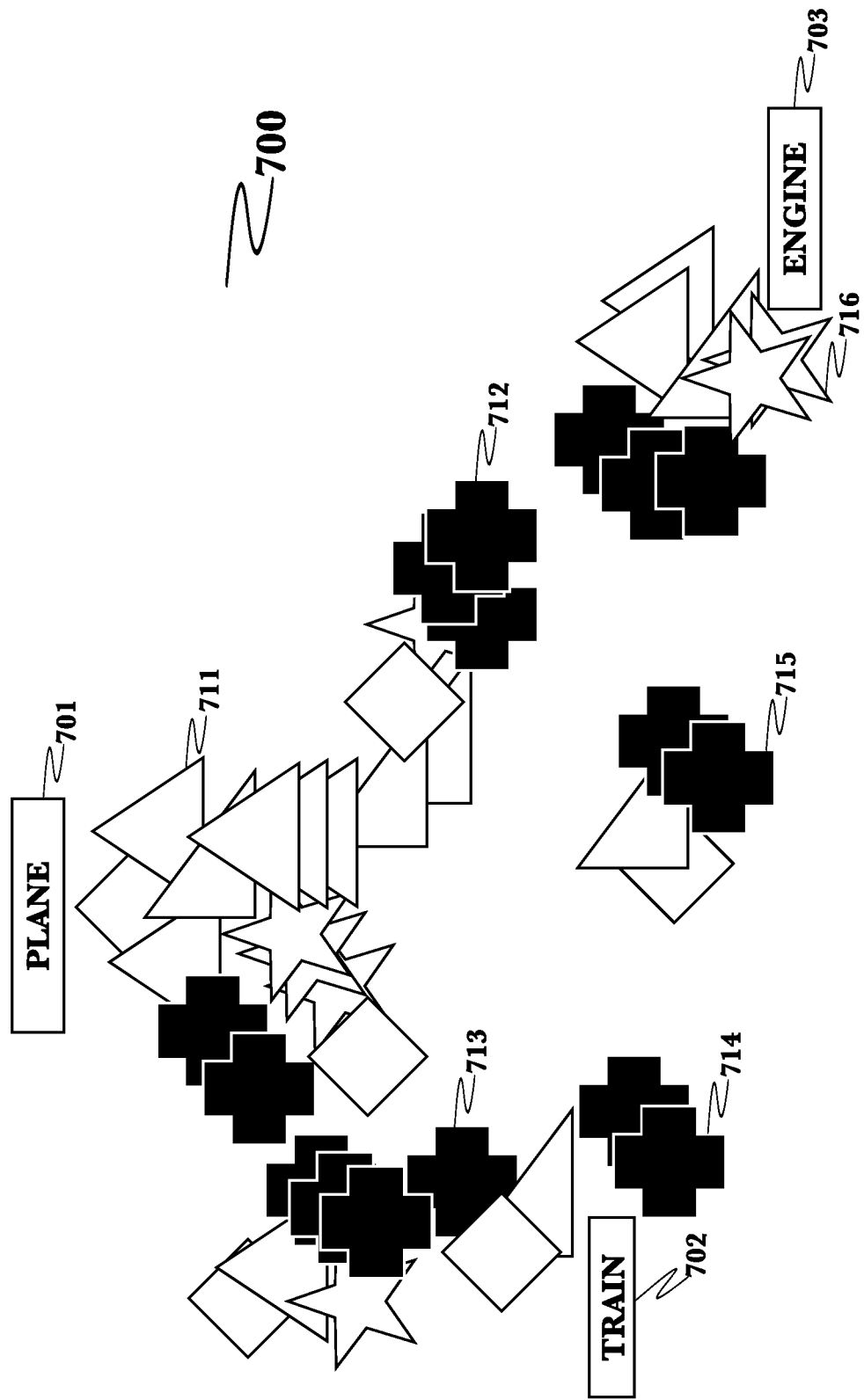
FIG. 7 shows an exemplary document distribution display using three retrieval tokens according to an embodiment of the invention.

FIG. 7 shows an exemplary document distribution display using three retrieval tokens 700 according to an embodiment of the invention. A typical display may contain analyst defined search tokens that have been used in the search analysis distributed a specific coordinates of the view field, here the tokens plane 701, train 702 and engine 703 are used as natural language examples although any string of characters that convey meaning known to those skilled in the field may be used as terms in a document search. Documents may be represented by icons or simple symbols which may be displayed as differing shapes to denote specific document types 711, 712, 716. For example: memo vs. review paper, vs. reference book, although any document format known to those skilled in the field might be included. As with tokens document representations may exhibit color coding to convey further information about the subject (not shown). The positioning of tokens may be specified by users as desired. Documents will position at coordinates reflecting the cumulative strength of its affiliation with each search token. Affiliation is calculated predominantly by the number of times a search term is present in the document and the weight given to each of the search terms during search analysis set-up. As examples, documents with high repetition of the token "train" but very few "plane" or "engine" references may look like grouping 714 whereas documents where "train" and "engine" exert similar affiliation strength may form grouping 715. Grouping 715 may contain documents discussing the use or maintenance of engines in trains. Grouping 716 may begin at the bottom right as having greatly predominant references to engines, or more simply stated, "be about" engines whereas the documents at the top left of that grouping also pertain, at least sparingly, to planes and trains and may contain documents with paragraphs or pages discussing engines in planes and engines in trains 716. Large single groupings of documents or multiple heterogeneous groupings that represent a small spectrum of relative term prevalence may form large flowing groups that vary greatly in the relative mixture of token presence. Group 711-712 is one such example where the documents around the "711" label appear to be highly plane specific whereas those around the "712" label would be expected to discuss planes and engines approximately equally. Grouping 713 would be similar but involving trains and planes.

Figure 8:
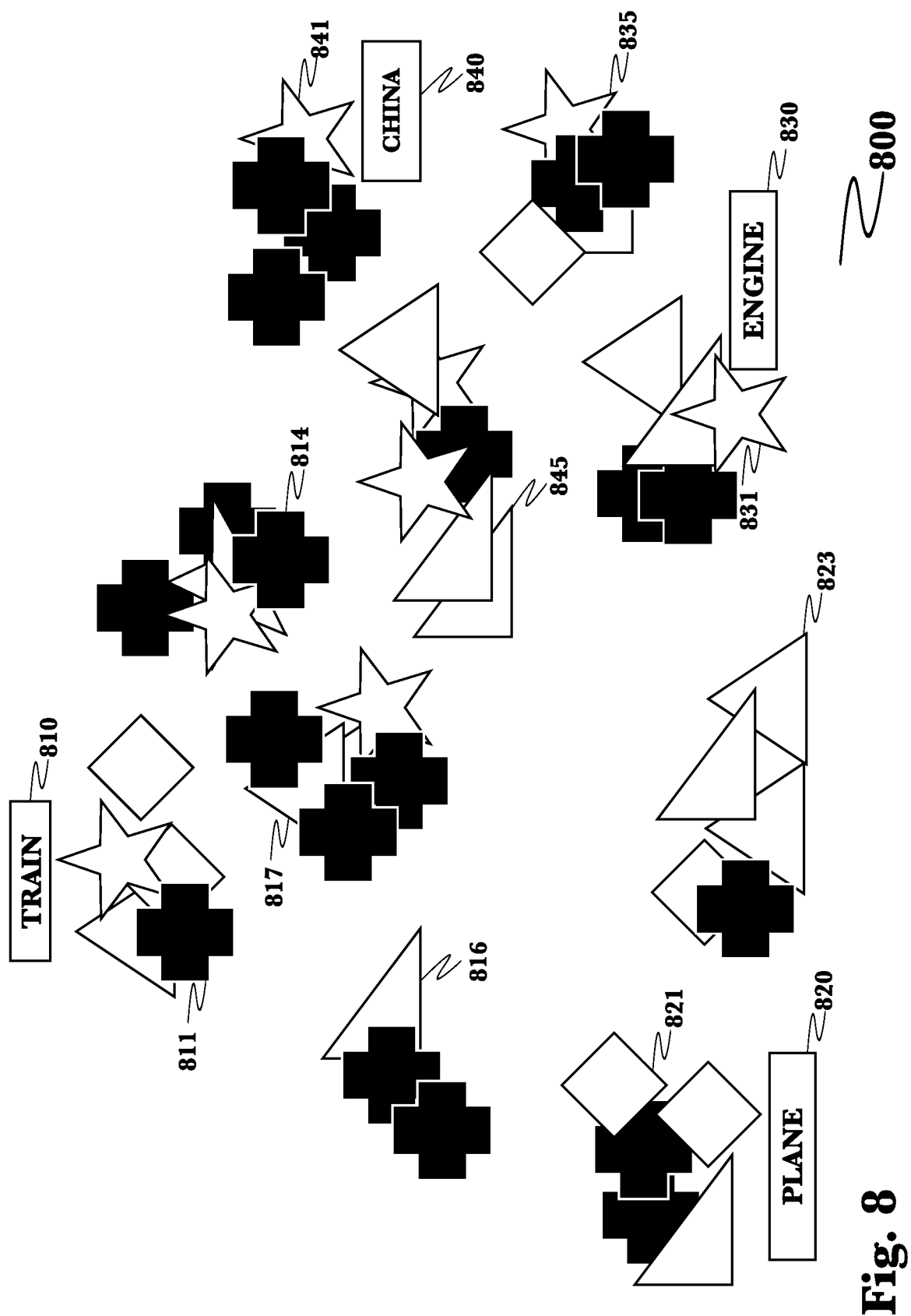
FIG. 8 shows an exemplary document distribution display using four search tokens according to an embodiment of the invention.

FIG. 8 shows an exemplary document distribution display using four search tokens 800 according to an embodiment of the invention. Addition of a fourth search term to the search as outlined in 400 has a great effect on the grouping of the documents. Here the tokens train 810, plane 820 and engine 830 and China 840 are used as natural language examples although any string of characters that convey meaning known to those skilled in the field may be used as terms in a document search. Documents may be represented by icons or simple symbols which may be displayed as differing shapes to denote specific document types 831, 845, 835. For example: memo vs. review paper, vs. reference book, although any document format known to those skilled in the field might be included. As with tokens document representations may exhibit color coding to convey further information about the subject (not shown). Again, we see document groupings that indicate the member documents may have an overwhelming preponderance of a single search term such as grouping 811 and train, grouping 841 and China, grouping 831 and engine, and grouping 821 and plane. Other groupings indicate documents concerning both planes and trains 816. China and trains 814 planes and engines 823 and engines and China 835. Multiple search terms may also cause varying degrees of ambiguity such as grouping 845 which may contain documents containing references purely to planes and China, or may contain references purely to engines and trains, or may contain a mixture of these terms either within single documents or within differing documents in that grouping. Similar ambiguities exist to varying extents in grouping 817 which may contain references to train and engine of train China and plane. In these circumstances the ability to change rotation, translation and especially token coordinate placement 600 come to use in ambiguity resolution.

Figure 9:
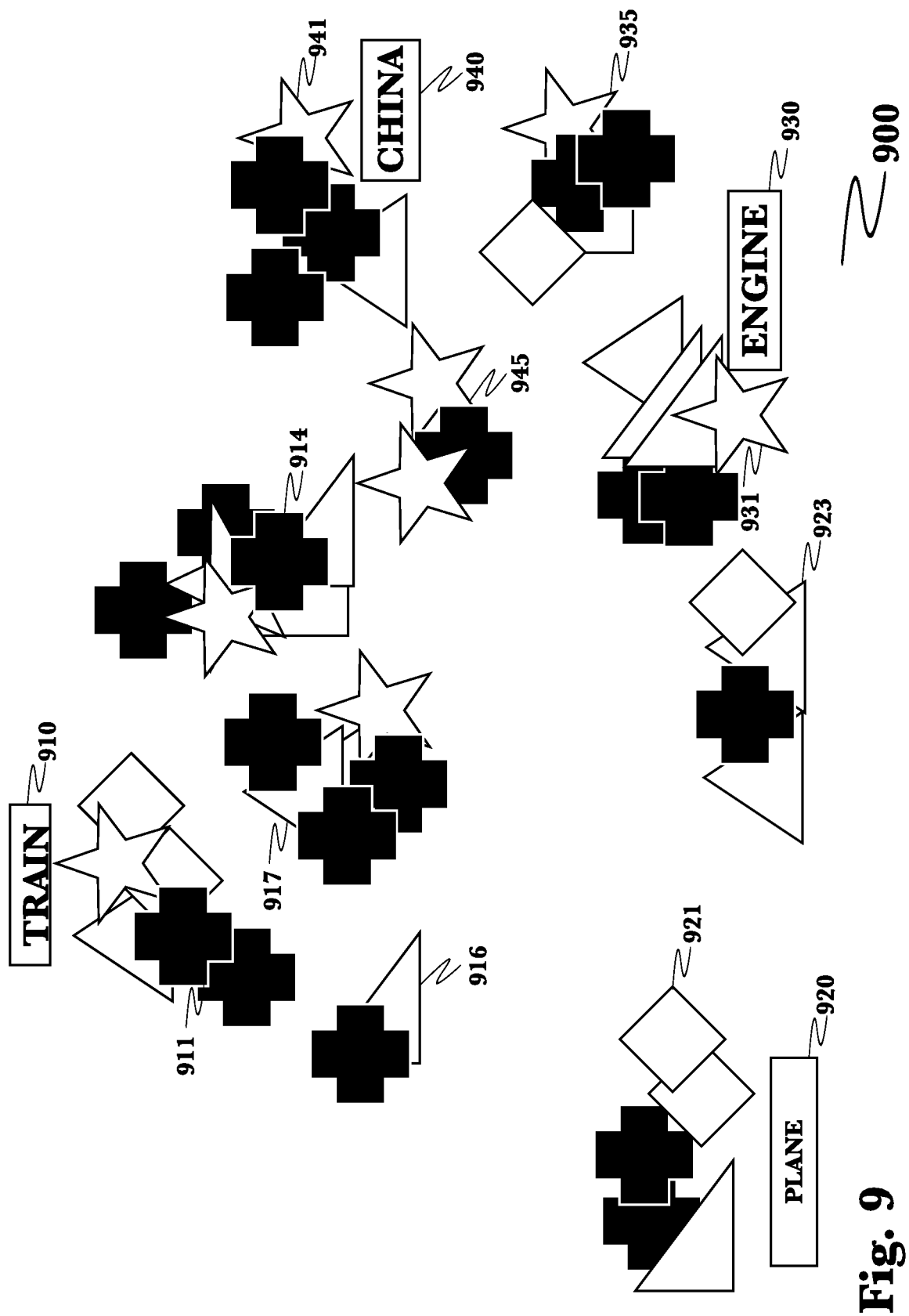
FIG. 9 shows an exemplary document distribution display changes in response to user de-emphasizing one search token when using four search tokens according to an embodiment of the invention.

FIG. 9 shows an exemplary document distribution display changes in response to user de-emphasizing one search token when using four search tokens 900 according to an embodiment of the invention. Seen here is the imagined effect of an analyst significantly reducing the weight of one of the search terms at the initiation of a search, "plane" in this example, on document coordinate positioning 920 using a search that is otherwise identical to that in 800. Here the de-emphasis of "plane" is reflected by the system on the display by a reduction in font size 920 compared to the other tokens 910, 930, 940. As may be expected, a small number of documents are unaffected 921, those may be documents in which terms other than "plane" play a negligible role in coordinate positioning, documents said to be solely about planes. Other document groupings 923 916, 917, 914, 945, 941, 935, 931 exist where even grouping document makeup may change compared to 800 for example some documents seen in grouping 816, have moved to grouping 911 among other changes. This serves to emphasize that the interaction between search terms may be more complex than first appears.

Figure 15:
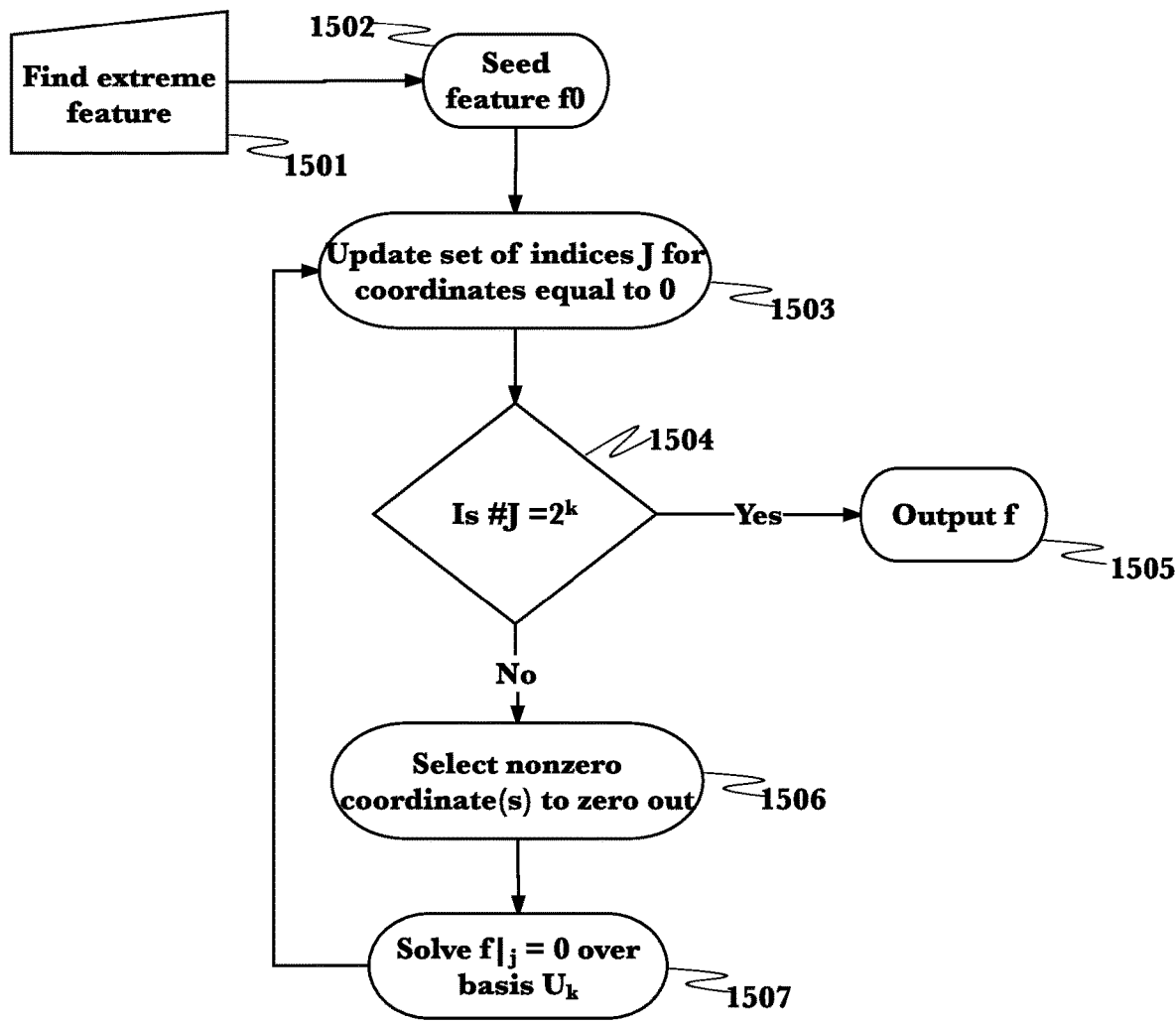
FIG. 15 is a process diagram of the calculation of extreme features by the system according to an embodiment of the invention.

FIG. 15 is a process diagram of the calculation of extreme features by the system according to an embodiment of the invention 1500. Descriptions of searches proposed thus far, while good approximations of returning documents that all completely pertain to the tokens provided, are effected by the fact that the searches are done on subspace representations of the total document corpus. The result is that the return of a document set all of a singular topic is not possible. A search for "plane" will indeed return many documents relating to "plane" but will also return much smaller numbers of documents for completely unrelated, seemingly illogical, topics, for example, the ip address "162.4.13.1," "quasars," "rain total in Butte, Mont. 1994," "Pluto demoted," and "ghost pepper cultivars," to name a very few possible topics from the universe. The number of "contaminant" topics may also vary from that given in the example, as is known to those skilled in the art. This subspace projection artifact can be largely, but never totally compensated using information theory and algorithms to find an extreme feature or vertex closest to the original topic of interest. Recursively running such an algorithm on a complex system such as presented here is calculation intensive and thus time consuming as known by those skilled in the art. The embodiment therefore calculates these corrections after the first, very good, approximation is calculated and displayed, while the user agent is inspecting the results. Extreme features, the information vertices for a given search are found by the embodiment 1501 by starting with the feature, or token of interest 1502. The set of all indices (J) where the coordinates are equal to 0 are then determined 1503 by iteratively 1503, 1506, 1507 determined by first selecting coordinates that are not equal to 0 1506 and then solving the for parameters $f|_j=0$ over the basis $U_k$ 1507. Those index values are added to the set 1503, a test for successful information vertex run 1504 and, if fails, the calculations begin again for another set of non-zeroed coordinated 1506. Calculation stops when #J=$2^K$ 1504 and the more accurate, extreme feature/information vertex set is displayed to the user or user agent 1505.

Figure 16:
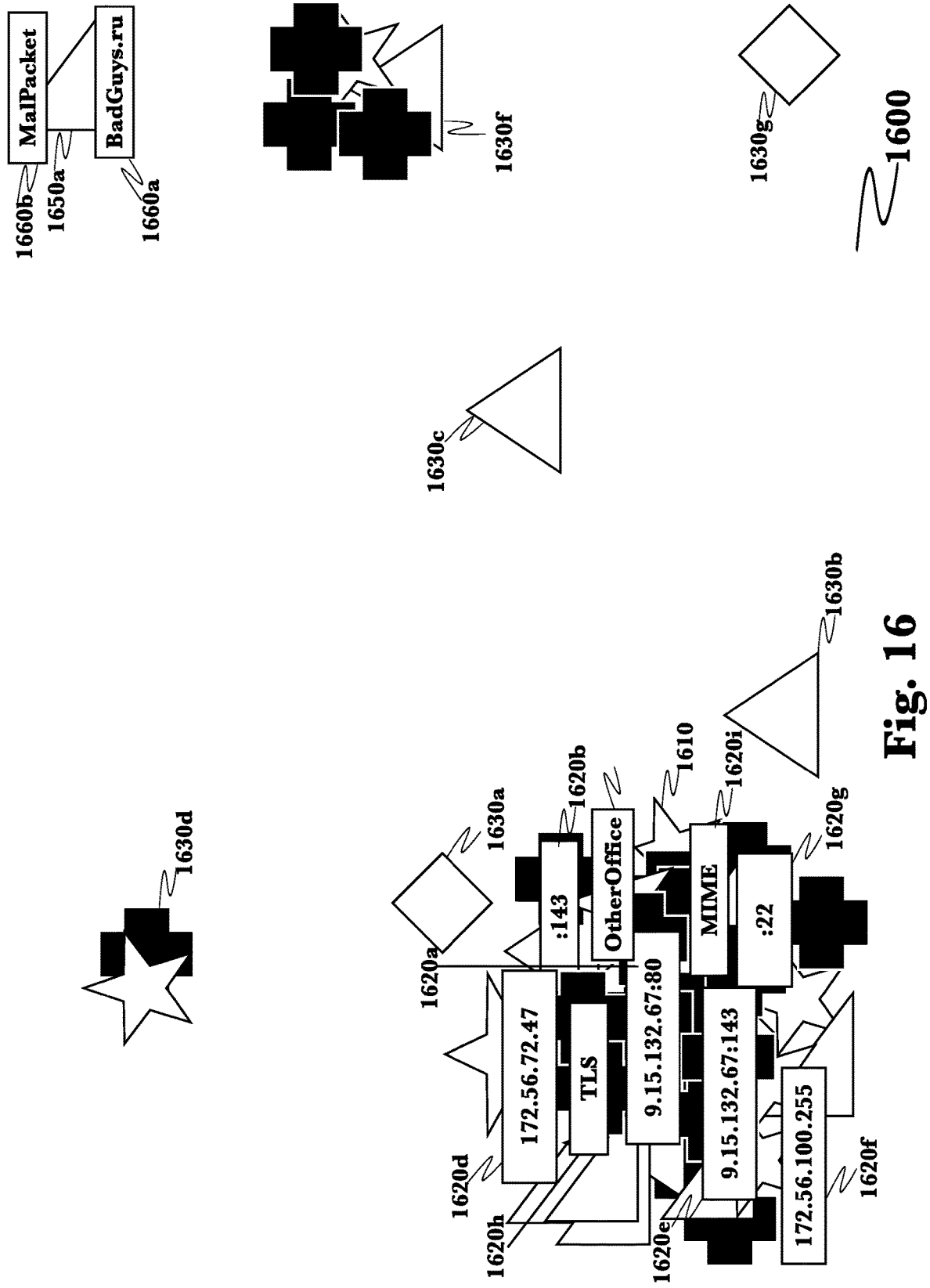
FIG. 16 shows an exemplary display of network traffic using multiple co-dimensionally grouped network search tokens according to an embodiment of the invention.

FIG. 16 shows an exemplary display of network traffic using multiple co-dimensionally grouped network search tokens 1600 according to an embodiment of the invention. Discovering anomalies in computer network traffic is one area of historical and emerging importance for which an embodiment of the invention is well suited. By treating all network transmission as unstructured units of information one can assign and search for specific tokens within those units or using previous terminology, documents. Of great interest and both financial and information property importance is the discovery, remediation and termination of cyberattacks. Counter-surveillance in this field may be divided into two important types, both of which can be very efficaciously performed using the embodiment. First is the discovery of ongoing attacks of a previously discovered and at least partially characterized nature. For this type of attack, an analyst on the system may enter a set of tokens for known safe, normal network transmissions on the system protected network 1620*a-j* at the same dimensional coordinates within the display space. These tokens draw all normal, known safe transmissions to one compact region of the screen 1610. Here both label placement and network transmission spread under the current view are enlarged for illustrative purposes. The analyst may the either place all known attack signatures 1660*a*, 1660*b* in one small area away from the "safe" display point, or spread them so as to better distinguish different types of attack. Tokens may also always be moved or display viewpoint (rotation, zoom ratio and transcription) changed separate overlapping individual transmission documents of groups. In this way ongoing attacks of previous nature can be very easily visualized and the targets quickly identified even on a very large, high traffic network system. The second type of search does require that the analyst have significant foreknowledge of possible methods and targets of possible attacks, but allows the discovery and characterization of novel attacks with uncharacterized of poorly characterized characteristics. Such analysis starts out by removing most of the network traffic from the display as previously described 1620*a-j*, 1610 and may include also delegating known attack vectors to a specific area of the screen 1650*a*, 1660*a*, 1660*b*. This will leave only transmission documents that do not share any strong characteristics with the two known groups 1630*c*, 1630*d*, 1630*f*, 1630*g*. The analyst, using foreknowledge may then choose what transmissions to further investigate by possibly changing display perspective and retrieving the extreme feature filtered tokens underlying the transmissions of interest from the system for purposes known to those skilled in the art. There may be one or more, possibly several, transmission documents that lie very close or partially overlapping the "safe" grouping 1630*a*, 1630*b* which may be of added interest due to the type of attack suspected. These may be further isolated from the main grouping by both display perspective changes and manipulation of "safe" label placement.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 10:
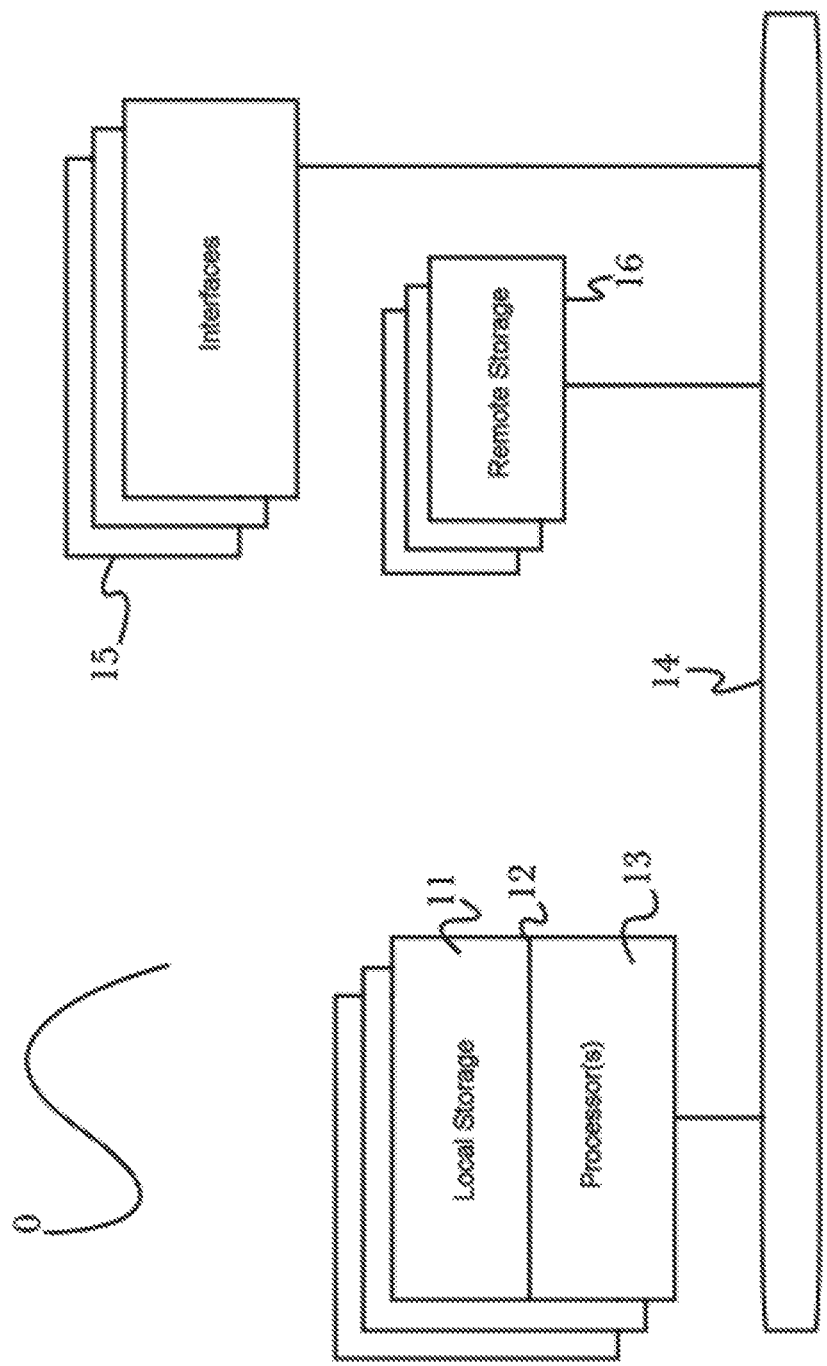
FIG. 10 is a block diagram illustrating an exemplary hardware architecture of a computing device used in various embodiments of the invention.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
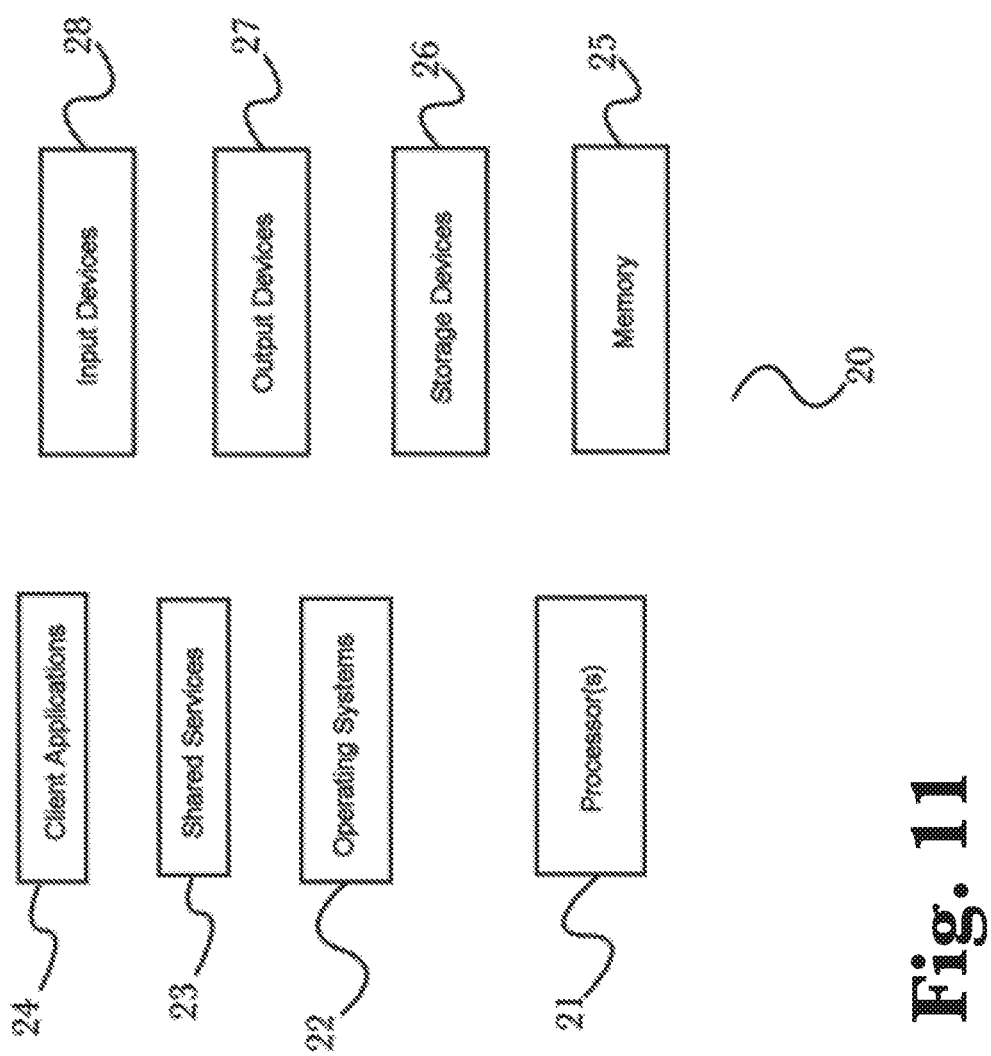
FIG. 11 is a block diagram illustrating an exemplary logical architecture for a client device, according to various embodiments of the invention.

In some embodiments, systems according to the present invention may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 12:
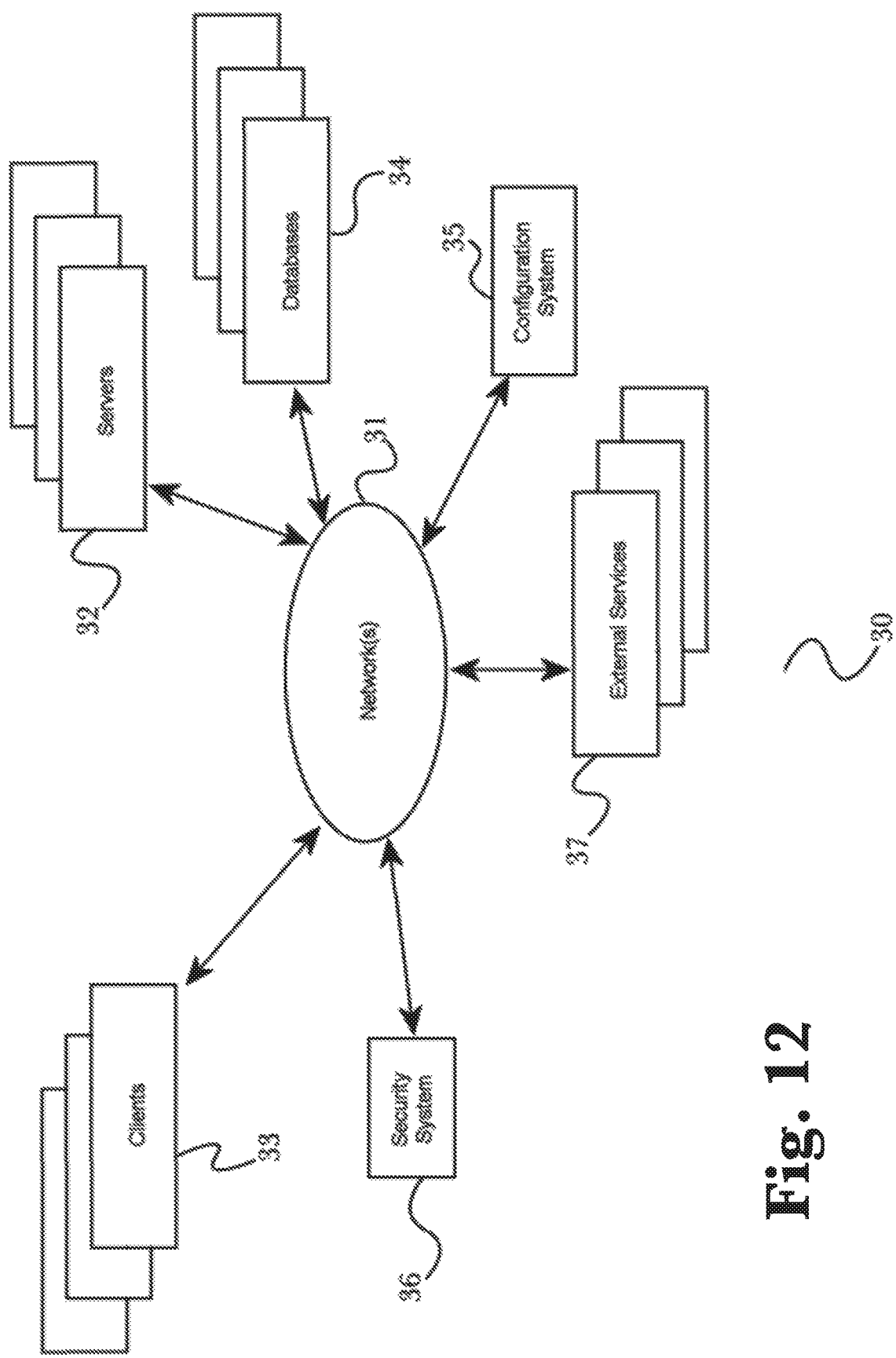
FIG. 12 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 12, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 13:
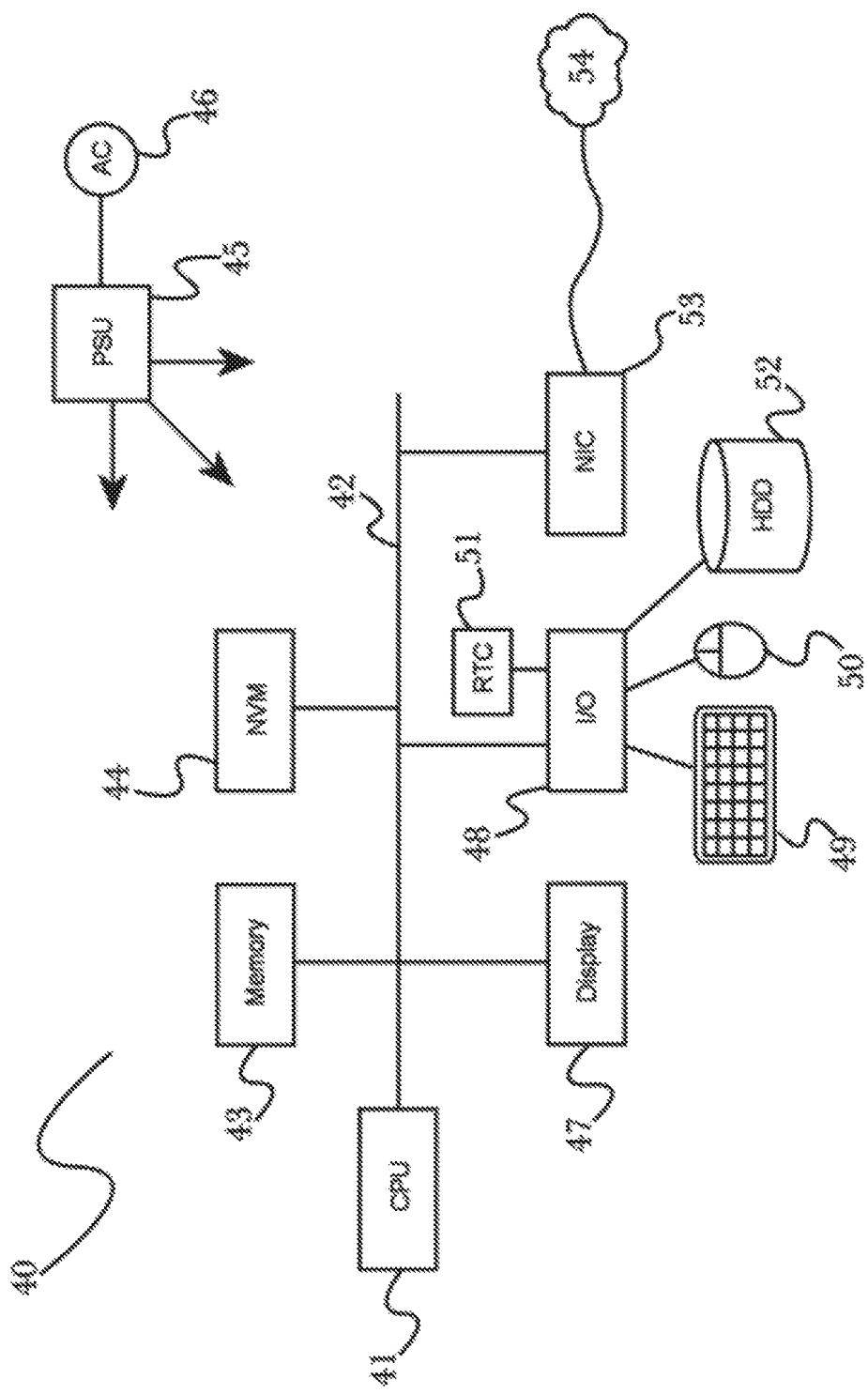
FIG. 13 is another block diagram illustrating an exemplary hardware architecture of a computing device used in various embodiments of the invention.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A system, comprising:
one or more processors; and
memory storing instructions that, as a result of execution by the one or more processors, cause the system to at least:
provide a user interface that:
presents a plurality of icons on a graph to display a search result, the plurality of icons individually representing records of the search result and having coordinates calculated based at least in part on a first set of weights of tokens used to calculate the search result;
presents a first icon representative of a token, the token being from the tokens;
allows a user to manipulate the icon representative of the token by changing coordinates of the token to change a weight of the token in calculation of coordinates of icons representing records;
recalculates the coordinates of the plurality of icons based at least in part on the manipulation of the icon and a second set of weights of the tokens indicated by the manipulation; and
updates at least a position of a second icon representing a record based at least in part on the recalculated coordinates to display a different view of the search result.

2. The system of claim 1, wherein the first set of weights is determined based at least in part on a first position of the icon prior to the manipulation of the second icon, wherein the second set of weights is determined based at least in part on a second position of the icon resulting from the manipulation of the second icon, the second position being different from the first position and the first set of weights being different from the second set of weights.

3. The system of claim 1, wherein the record comprises unstructured data.

4. The system of claim 1, wherein the record comprises structured data.

5. The system of claim 1, wherein the record comprises network flow data.

6. The system of claim 1, wherein the token comprises a value in the record.

7. The system of claim 1, wherein:
a location of the second icon is determined based at least in part on a projection of the token onto a subspace of a multidimensional space; and
locations for the plurality of icons in the user interface are determined such that higher occurrence of the token results in closer proximity to the location of the second icon.

8. The system of claim 1, wherein the system allows the user to manipulate the icon representative of the token by deleting the token to result in an coordinates of records to be calculated independently of the token.

9. The system of claim 1, wherein the system allows the user to manipulate the icon representative of the token by adding a token to result in coordinates of results to be calculated based at least in part on the added token.

10. The system of claim 1, wherein the user interface recalculates the coordinates by at least:
creating a partial basis matrix for search from the tokens based at least in part on the second set of weights;
performing a search of records using the partial basis matrix for search and another partial basis matrix of a reduced rank subspace of a space of tokens, thereby resulting in coordinates of search tokens within the subspace.

11. A computer-implemented method, comprising:
providing a user interface that:
displays search results by displaying a first plurality of icons, the plurality of icons comprising a first icon representing a record of the search result and a second icon representing a token used to calculate the search result, the first icon and second icon having respective coordinates calculated based at least in part on a first set of weights of tokens; and
allows manipulation of the second icon by changing coordinates of the second icon to change a weight of the second token and thereby indicate a second set of weights of tokens;
as a result of the manipulation of the second icon, determining an updated search result representative of a plurality of records, the plurality of records comprising the record, wherein the updated search result is based at least in part on the second set of weights; and
displaying a second plurality of icons representative of the updated search result, the second plurality of icons having respective coordinates calculated based, at least in part, on the second set of weights of tokens.

12. The computer-implemented method of claim 11, wherein the user interface displays the first plurality of icons based at least in part on a respective combination of tokens.

13. The computer-implemented method of claim 12, wherein the combination is a weighted combination based at least in part on a location of an icon.

14. The computer-implemented method of claim 11, wherein the record comprises a plurality of field values and the token is a field value of the plurality of field values.

15. The computer-implemented method of claim 11, wherein the record comprises unstructured data and the token is a value determined from the unstructured data.

16. The computer-implemented method of claim 11, wherein the record comprises structured data and the token is a value determined from the structured data.

17. The computer-implemented method of claim 11, further comprising determining locations for the second plurality of icons based at least in part on the manipulation.

18. The computer-implemented method of claim 17, wherein determining the locations comprises calculating a plurality of projections onto a subspace of a multidimensional space.

19. The computer-implemented method of claim 18, wherein coordinate values in the multidimensional space are tokens and a basis vector for the subspace is determined based at least in part on a plurality of token values.

20. The computer-implemented method of claim 11, wherein manipulation of the token comprises deletion of the token, addition of another token to the token, or a change of coordinates of the token.

* * * * *